United States Patent
Norris et al.

(10) Patent No.: US 11,403,153 B2
(45) Date of Patent: Aug. 2, 2022

(54) SITE SPECIFIC NOTIFICATIONS

(71) Applicant: Highland Ag Solutions, LLC, Mulberry, FL (US)

(72) Inventors: Kaylee Norris, Mulberry, FL (US); Marco Aguilar, Mulberry, FL (US)

(73) Assignees: Highland Precision Agriculture LLC, Mulberry, FL (US); Highland AG Solutions, LLC, Mulberry, FL (US)

( * ) Notice: Subject to any disclaimer, the term of this patent is extended or adjusted under 35 U.S.C. 154(b) by 0 days.

(21) Appl. No.: 16/929,981

(22) Filed: Jul. 15, 2020

(65) Prior Publication Data

US 2022/0019488 A1  Jan. 20, 2022

(51) Int. Cl.
| | |
|---|---|
| *G06F 9/54* | (2006.01) |
| *G06F 16/909* | (2019.01) |
| *G06F 16/957* | (2019.01) |
| *G06F 3/0482* | (2013.01) |

(52) U.S. Cl.
CPC ............ *G06F 9/542* (2013.01); *G06F 3/0482* (2013.01); *G06F 9/547* (2013.01); *G06F 16/909* (2019.01); *G06F 16/9577* (2019.01)

(58) Field of Classification Search
CPC .... G06F 9/542; G06F 16/909; G06F 16/9577; G06F 3/0482; G06F 9/547
See application file for complete search history.

(56) References Cited

U.S. PATENT DOCUMENTS

| | | | |
|---|---|---|---|
| 7,996,511 B1* | 8/2011 | Wiese | G06F 9/5072 |
| | | | 709/223 |
| 8,280,012 B2 | 10/2012 | Kirchmeier et al. | |
| 2010/0010854 A1 | 1/2010 | Watanabe | |
| 2011/0295500 A1 | 12/2011 | Hunt et al. | |
| 2014/0012868 A1* | 1/2014 | Nakazaki | G06F 16/532 |
| | | | 707/758 |
| 2015/0106144 A1* | 4/2015 | Mangerson | G06Q 10/063114 |
| | | | 705/7.15 |
| 2018/0341891 A1* | 11/2018 | Setchell | G06Q 10/06 |
| 2021/0202067 A1* | 7/2021 | Williams | G06Q 50/265 |
| 2022/0036286 A1* | 2/2022 | Norris | G06Q 10/063118 |

\* cited by examiner

*Primary Examiner* — S. Sough
*Assistant Examiner* — Kimberly L Jordan
(74) *Attorney, Agent, or Firm* — Fish & Richardson P.C.

(57) ABSTRACT

Methods, systems, and apparatus, including computer programs encoded on a computer storage medium, for generating site specific notifications for geographic sites. A set of sites and a log requirements for the sites are associated. Each log requirement specifies a particular log item to be completed by a user by a completion time, and each site specifies a particular physical location. Sites and site users are also associated. Site users for a site are users specified as being responsible for the site. Each site user is associated with at least one log requirement for the site. Each site has an associated notified user. As site users complete logs for the site, or fail to complete logs, the notified user for the site is notified.

17 Claims, 7 Drawing Sheets

US 11,403,153 B2

SITE SPECIFIC NOTIFICATIONS

BACKGROUND

An agricultural enterprise includes multiple different sites, each of which is a unique physical location or area. For example, an agricultural enterprise may have several farm field locations, packinghouses, cold storage locations, etc. Typically the agricultural enterprise employees are assigned specific duties, and often for specific sites. For example, field workers may work primarily in a field location and report to a site supervisor. The site supervisor may be responsible for all teams assigned to the site or all teams assigned to multiple sites. Likewise, a team of employees may operation a packing facility, and report to a line supervisor. There may be several line supervisors at the packing facility, and each may manage a separate team of different employees.

To operate these various sites, certain actions must be performed periodically. For example, a field site may require a daily inspection of a water source, and a weekly inspection of a flood pond, and so on. A packinghouse may require daily inspections for sanitation, weekly inspections for machinery calibration, and so on. Additionally, state and federal regulations, as well as recording practices that are internal to the enterprise, may require logs detailing when actions were performed, and the results of such actions.

To ensure that the actions are performed, employees responsible for performing the actions may be provided reminders, either in paper form or electronically. In the case of the former, log sheets for each action at a site may be provided each day, while in the case of the latter, a list of actions to be performed for a site may be available through a workflow management system.

Despite the reminders and schedule availability, employees often fail to perform the actions, or, in some situations, fail to properly log an action after performing the action. Both the employee and the supervisor of the employee should be able to easily ascertain whether actions are outstanding or overdue for a site.

SUMMARY

This specification describes technologies relating to generating site specific notifications for geographic sites. A set of sites and log requirements for the sites are associated. Each log requirement specifies a particular log item to be completed by a user by a completion time, and each site specifies a particular physical location. Sites and site users are also associated. Site users for a site are users specified as being responsible for the site. Each site user is associated with at least one log requirement for the site. Each site has an associated notified user. As site users complete logs for the site, or fail to complete logs, the notified user for the site is notified.

In general, one innovative aspect of the subject matter described in this specification can be embodied in methods that include the actions A method performed by data processing apparatus, the method comprising: storing, in a data store, a first association of a plurality of sites and a plurality of log requirements, wherein the first association associates, for each site, a set of log requirements for the site, wherein: each log requirement specifies a particular log item to be completed by a user by a completion time, each site specifies a particular physical location that is different from each other physical location for each other site; storing, in the data store, a second association of the plurality of sites and a plurality of site users, wherein the second association associates, for each site, a set of users that are specified as being responsible for the site as site users for the site, wherein each site user is associated with at least one log requirement for the site; storing, in the data store, a third association of the plurality of sites and a plurality of notified users, wherein the third association associates, for each site, at least one notified user that receives notifications for particular log items associated with the site; for each log requirement, determining, by the data processing apparatus, whether the log requirement is completed by the completion time for the log requirement; for each log requirement determined not to be completed by the completion time for the log requirement: generating a first notification specifying the log requirement was not completed by the completion time, determining, based on the first association, the second association, and the third association, the notified user for the site for which the log requirement is associated, and sending, to the notified user, the first notification; for each log requirement, determining, by the data processing apparatus, whether the log requirement is completed by the completion time for the log requirement; for each log requirement determined to be completed by the completion time for the log requirement: generating a second notification specifying the log requirement was completed, determining, based on the first association, the second association, and the third association, the notified user for the site for which the log requirement is associated, sending, to the notified user, the second notification. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The associations between sites, log requirements, site users and notified users enables the notified users to receive notifications for only the sites and site users for which they are responsible. This eliminates the need for manually coding notification scripts that may quickly become outdated by employee attrition or log requirement changes. The graphical user interfaces enable an environment that facilitates the associations in an intuitive and flexible manner.

In some implementations, an association to provide notifications for log requirements for a specific site is based on the notified user being responsible for the site. This enables notifications to be provided to the notified user without requiring the direct reports to the notified user to be specified. In other words, the notifications are provided based on the notified user's site responsibility, and not based on a hierarchal employee/supervisor arrangement. This ensures that the notified user will be provided notifications despite employee attrition or employee changes, thus simplifying data management.

In other implementations, an association to provide notifications for log requirements for a specific site are based on the notified user being responsible for the site, and based on the notified user being associated with the specific log requirements. This enables notifications for a proper subset of log requirements for a site to be provided to the notified user without requiring the direct reports to the notified user to be specified. In other words, the notifications are provided based on the notified user's site responsibility and the proper subset of log requirements for which the notified user is responsible, and not based on a hierarchal employee/supervisor arrangement. Again, this ensures that the notified user will be provided notifications despite employee attrition or employee changes, thus simplifying data management. Moreover, the notified user is not provided with notification for which the notified user is not responsible.

In other implementation, an association to provide notifications for log requirements for a specific site may be further based on the notified user being a supervisor of a person. In some implementations, quality assurance checking is performed to ensure that each log requirement has at least one site user that can perform the log item specified by the log requirement, and further requires that each log requirement is associated with at least one notified user to receive notifications for the log requirement. This ensures that every log requirement can be performed by at least one site user, and every log requirement will be reported to at least one notified user. This also eliminates the manual error checking requirement for assigning site users and notified users to log requirements, and ensures that new log requirements that are added to a site will be associated with at least one site user and one notified user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A set of sites and log requirements for the sites are associated. Each log requirement specifies a particular log item to be completed by a user by a completion time, and each site specifies a particular physical location. Sites and site users are also associated. Site users for a site are users specified as being responsible for the site. Each site user is associated with at least one log requirement for the site. Each site has an associated notified user. As site users complete logs for the site, or fail to complete logs, the notified user for the site is notified.

The associations of notified users may overlap with site users such that site users are notified users, or, alternatively, the notified users may be different users from the site users. In the case of the latter, the notified user may be a supervisor of the site users and receive notifications for each of the site users. Alternatively, the notified user may receive all notifications for a site. In either case, the notified users may be automatically associated with specific notifications, thereby eliminating the need for specific coding or scripting for particular notifications for particular notified users. Thus, by associating a notified user as an object to receive notifications based on either a supervisory role of site users or as a notified user for the site, the data structures necessary to cause the notifications to be sent to the notified user are automatically generated. Likewise, when a notified user is removed, so are the corresponding data structures. Thus, the need for code maintenance or scripting is simplified for not only the establishment of notified user, but also for the removal of notified users. This can save many hours of scripting and code maintenance that would otherwise be required by IT professional.

Figure 1A:
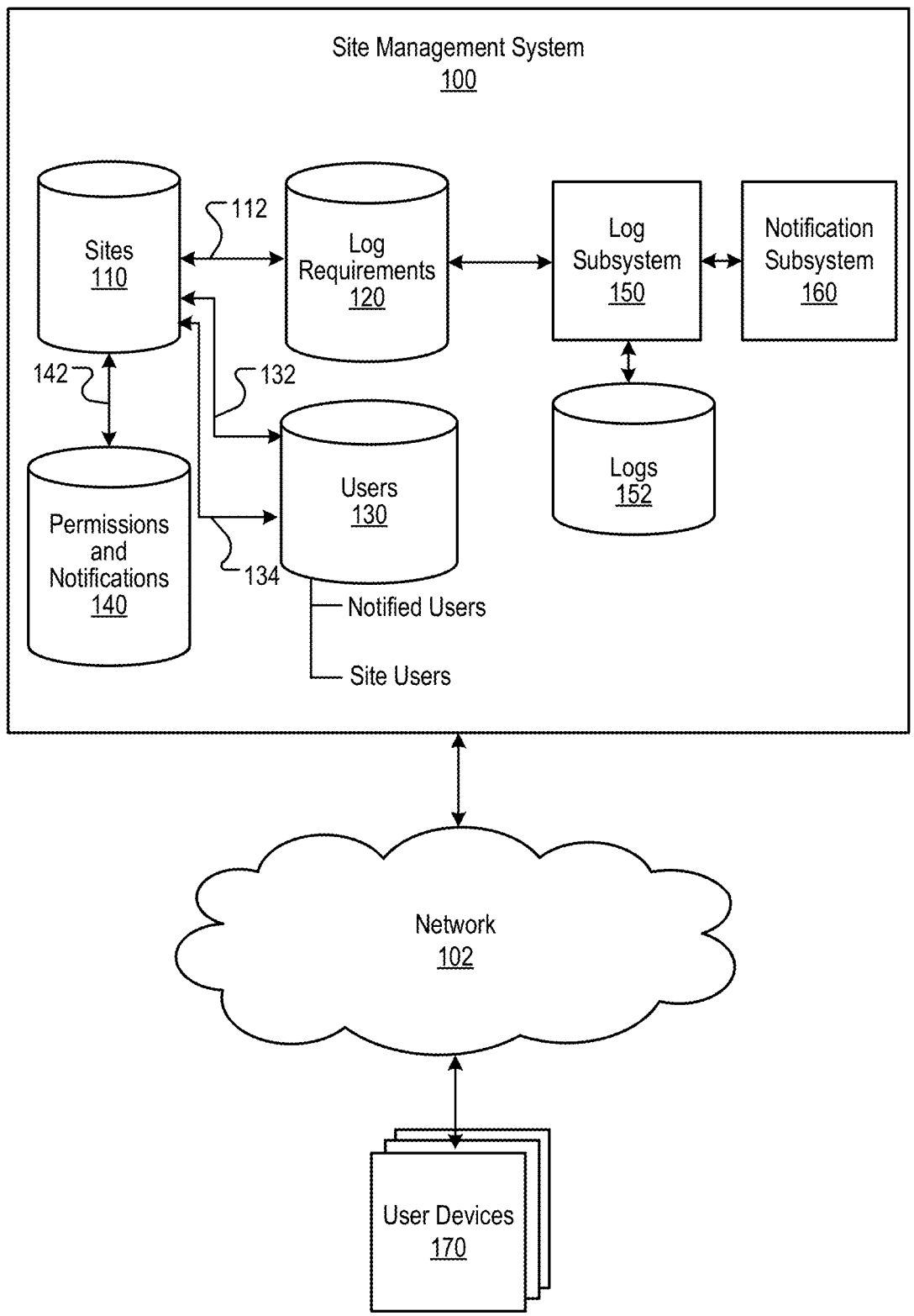
FIG. 1A is system diagram of a site management system that provides site specific notification.

FIG. 1A is system diagram of a site management system 100 that provides specific notifications. The example architecture described in this specification is illustrative, and other architectures and functional distributions can also be used. The system 100 may be implemented in a data processing apparatus that includes one or more computer devices and that is operable to communicate over a network 102. The network 102 may be a local area network, a wide area network, or the Internet. The network 102 may also include or be in commutation with other networks, either directly or through gateways.

The system 100 includes sites data 110, log requirements data 120, user data 130, and permissions and notifications data 140. These data sets may be part of a single data set, such as a single database, or separate data sets with relational associations, or may be part of any other data structure that facilitates the relations and associations described below.

Figure 1B:
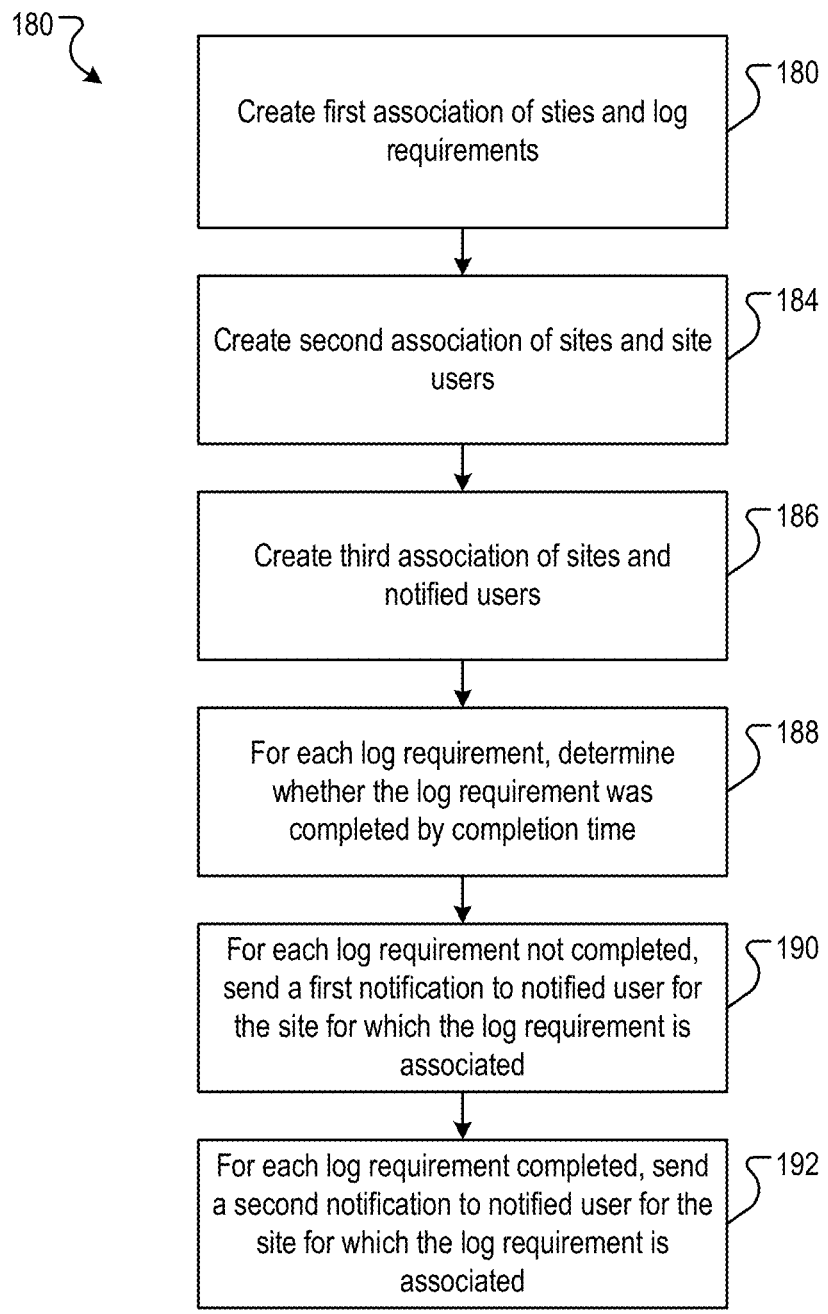
FIG. 1B is a flow diagram of an example process for providing site specific notifications.

Operation of the system 100 is described with reference to FIG. 1B, which is a flow diagram of an example process 180 for providing site specific notifications. The process 180 is performed by computer devices that are used to realize the system of FIG. 1A.

The process 180 creates a first association 112 of sites and log requirements (182). In particular, the first association associates, for each site, a set of log requirements for the site. Each log requirement specifies a particular log item to be completed by a completion time, and each site specifies a particular physical location that is different from each other physical location for each other site. For example, a first farm location, e.g., Farm A, may have a first set of log requirements to be completed daily, and a second farm location, e.g., Farm B, may have a second set of log requirements to be completed daily. The sets of log requirements for each farm site may be the same, or may be different, with no overlap or partial overlap.

The log item specified by each log requirement is log that must be completed by a user. The log may need to be completed periodically by a completion time, e.g., by the first day of each month, or daily, etc. The log item may specify an inspection to be performed, or the re-supplying of feed, or any other action required to be performed for a site.

The process 180 creates a second association 132 of sites and sites users (184). In particular, a set of users that are specified as being responsible for the site are associated with the site as site users for the site. Again, the first farm location, e.g., Farm A, may have a first set of site users, and the second farm location, e.g., Farm B, may have a second set of site users. The sets of site users for each site may be the same, or the sets may be different, with no overlap or partial overlap.

Additionally, each site user is associated with at least one log requirement for the site. Users that are associated with a log requirement for a site are responsible for ensuring that the log item specified by the log requirement is completed by the completion time. The log items are usually completed electronically by use of user devices 170.

The process 180 creates a third association 134 of sites and notified users (186). In particular, for each site, there is at least one notified user that receives notifications for particular log items associated with the site. A notified user may be a same user as a site user, or can be a different user. For example, assume that Farm A has 10 site users. Each of the 10 site users may be notified users. Alternatively, another user that is a supervisor of the 10 users may be the notified user for the Farm A site.

Site users for a site are assigned permission for the log items with which they are associated. User permissions are described in more detail with reference to FIG. 5 below. User permissions include a read permission and a write permission. The read permission enables a site user to read a log item of a log requirement with which the site user is associated, while the write permission enables a site user to write a log item of a log requirement with which the site user is associated. Other permissions can also be used.

As log items are completed, they are stored in log data 152. A log subsystem 150 processes the logs 152 and the log requirements to determine which logs items are completed and which are not completed. For example, for each log requirement, the process 180 determines whether the log requirement is completed by the completion time of the log requirement (188). The determination may be done by the log subsystem 150 when a log item is completed before a completion time of the log item, or may be done at the completion time of the log item. In the case of the latter, the determination may occur well after the actual completion time. This latter implementation can be do "batch" processing of completion determination so that notifications can be sent a specific completions times, e.g., the end of a workday, or at the middle of the workday. The former implementation allows for resource balancing, which may be a factor for very large agricultural enterprises, as a large batch process at certain times of the day may stress computer resources.

The process 180, for each log requirement determined not to be completed by the completion time for the log requirement, sends a first notification to notified user for the site for which the log requirement is associated (192). The first notification specifies the log item was not completed by the completion time. For example, the notification subsystem 160 may generate a first notification specifying the log requirement was not completed by the completion time, and then determine, based on the first association 112, the second association 132, and the third association 134, the notified user for the site for which the log requirement is associated. The log subsystem 160 then sends, to the notified user, the first notification. The first notification may be in the form of an e-mail, a text message with a link to a supervisory report, or any other appropriate mechanism to notify the notified user. A log item may be determined to not be completed when it has not been filled out, or has been completed incorrectly, such as partially completed and missing certain data when the log item is submitted by a user as completed.

The process 180, for each log requirement determined to be completed by the completion time for the log requirement, sends a second notification to notified user for the site for which the log requirement is associated (192). The second notification specifies the log item was completed by the completion time. For example, the notification subsystem 160 may generate a second notification specifying the log requirement was completed by the completion time, and then determine, based on the first association 112, the second association 132, and the third association 134, the notified user for the site for which the log requirement is associated. The log subsystem 160 then sends, to the notified user, the second notification. As with the first notification, the second notification may be in the form of an e-mail, a text message with a link to a supervisory report, or any other appropriate mechanism to notify the notified user.

The creation and maintaining of the associations described above is done through the use of various user interfaces, which are describe with reference to FIGS. 2-6. Each user interface may be provided for display on a user device. The user interface may be browser based or may be rendered by a standalone application.

Figure 2:
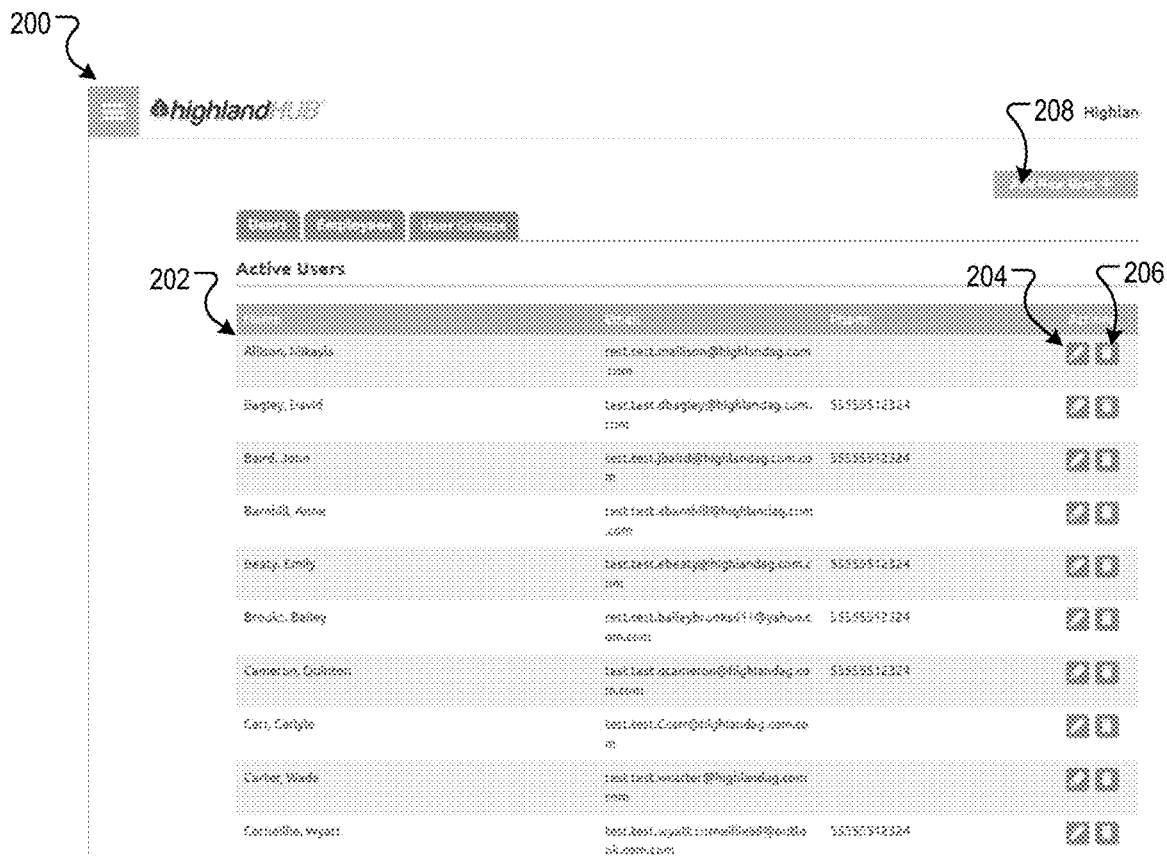
FIG. 2 is an illustration of a user interface for selecting user profiles.

FIG. 2 is an illustration of a user interface 200 for selecting user profiles. The user interface 200 includes a column 202 of existing user profiles. A particular profile may be selected for editing by use of an edit button 204, or deleted by use of a deletion button 206. A new user profile may be created by use of an add new user button 208.

Figure 3:
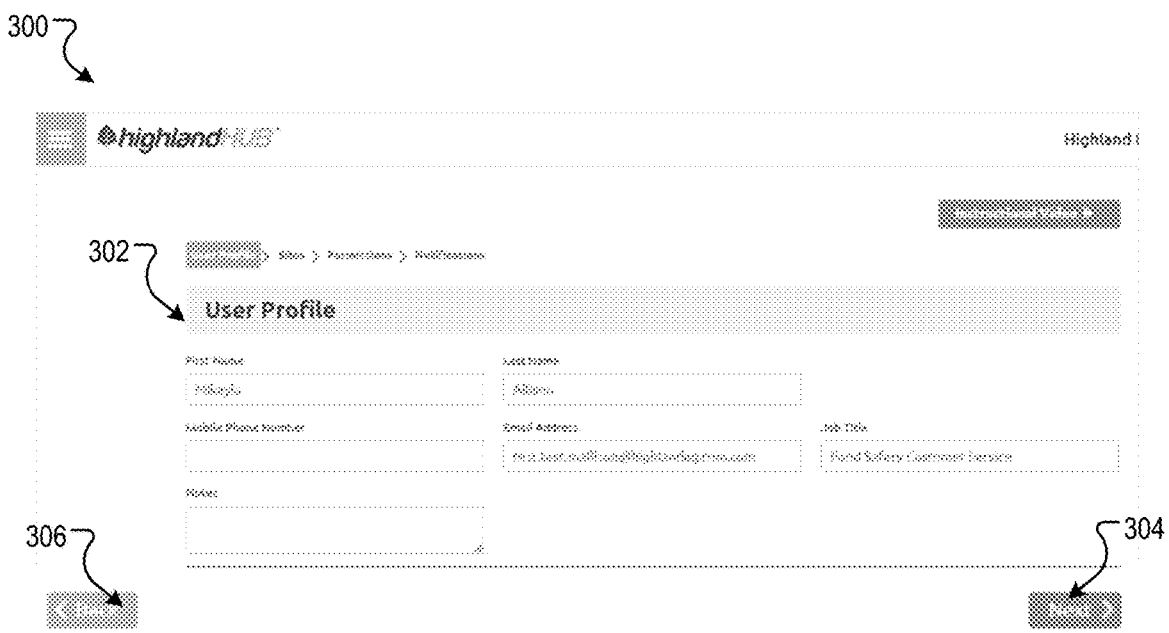
FIG. 3 is an illustration of a user interface for providing user information for a user profile.

FIG. 3 is an illustration of a user interface 300 for providing user information for a user profile. The user interface 300 includes user data fields 302 that can be used to populate user data for a particular user, such as name, contact information, job title, etc. The name and contact information can be tied to an employee database to determine the user's supervisor, if any, and any employees the user supervises, if any. Selecting the next button 304 transitions to the user interface 400 of FIG. 4, and selecting the back button 306 transitions to the user interface 200 of FIG. 2.

Figure 4:
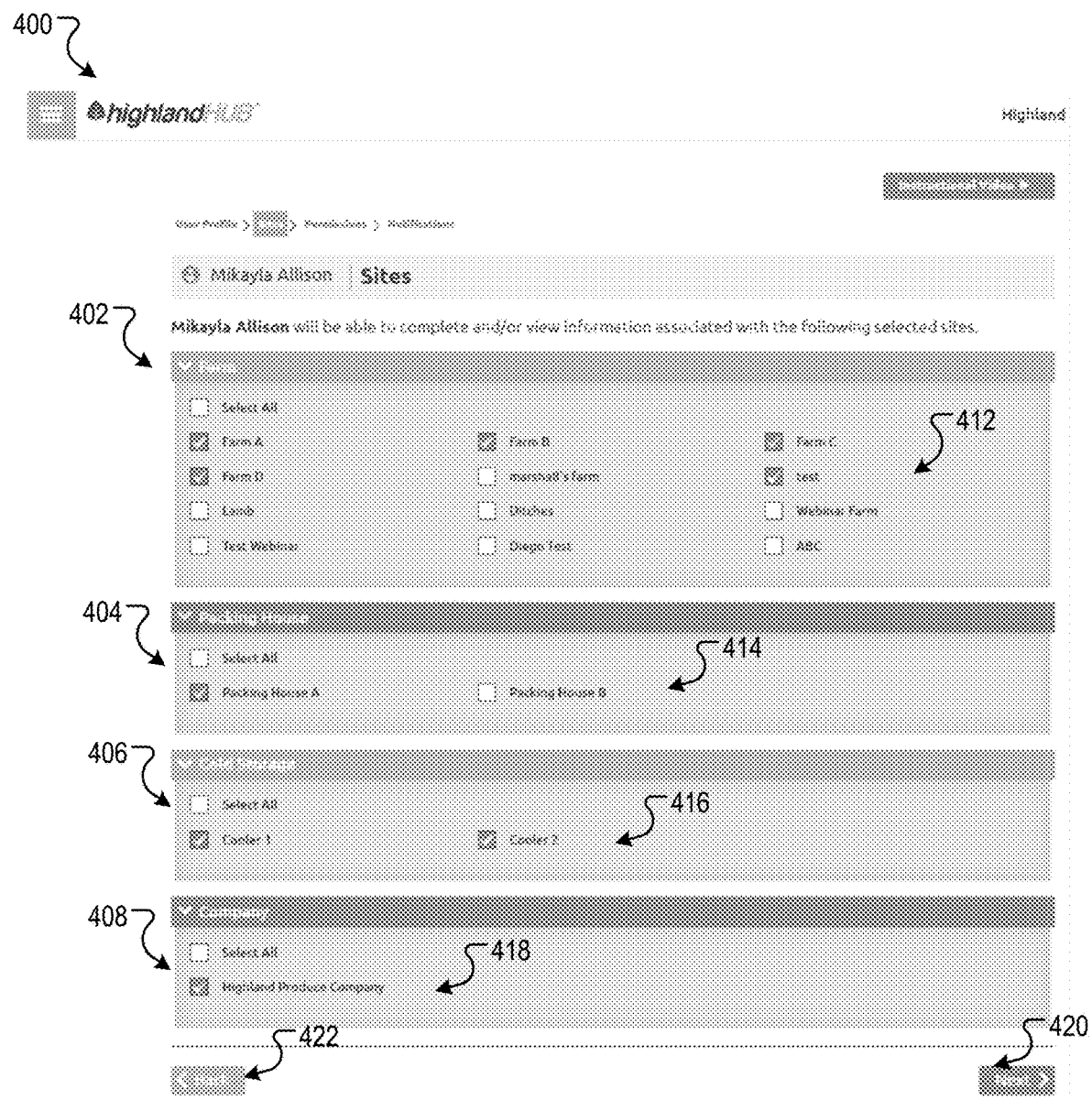
FIG. 4 is an illustration of a user interface for associating a user with one or more sites.

FIG. 4 is an illustration of a user interface 400 for associating a user with one or more sites. The user interface 400 includes a set of site categories 402, 404, 406 and 408 that each include a set of respective sites 412, 414, 416 and 418. A user may be associated with a particular site by selecting a check box selector that precedes each listed site. As shown in FIG. 4, the user is associated with nine selected sites. Selecting the next button 420 transitions to the user interface 500 of FIG. 5, and selecting the back button 422 transitions to the user interface 300 of FIG. 3. In some implementations, a user associated with a site is automatically associated with each log requirement for the site. In other implementations, the log requirements for a site may be individually selected for association with a user that is associated with the site.

Figure 5:
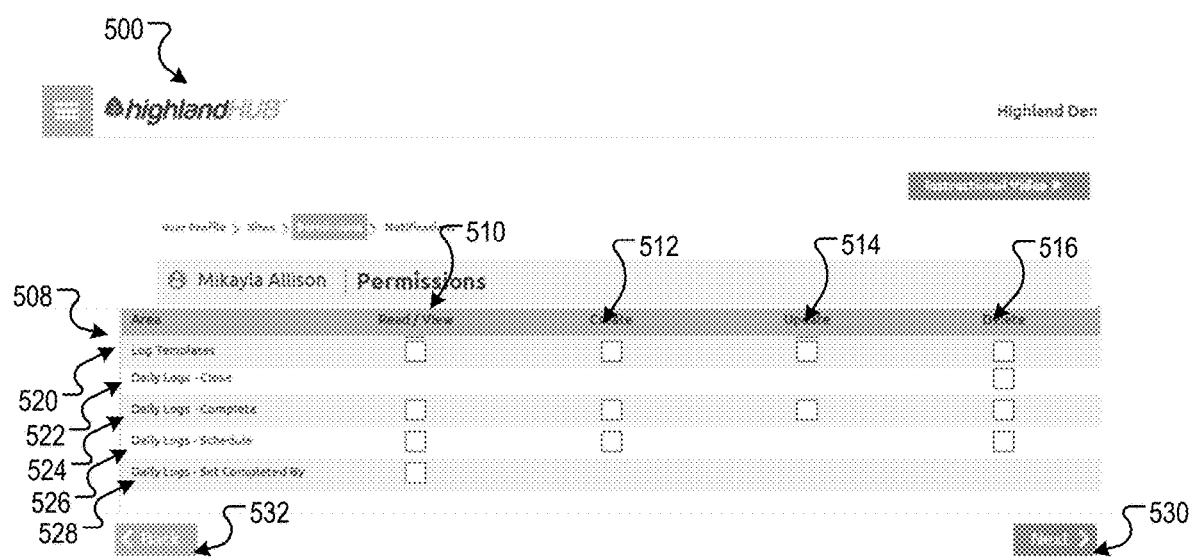
FIG. 5 is an illustration of a user interface for selecting permissions for a user.

FIG. 5 is an illustration of a user interface 500 for selecting permissions for a user. The user interface 500 includes a set of log requirements 508 and user permissions 510, 512, 514, and 516 for the log requirements 508. Some log requirements may only have a proper subset of the user permissions available for the site user, as the log item specified by the log requirement may not require certain actions or certain input that other log requirements may require.

The example log requirements include log templates 520, closed daily logs 422, completed daily logs 524, scheduled daily logs 526, and set completed by daily logs 528. Other or fewer log items can also be included. As described below, the actions association with permissions for each log requirement may differ.

The log template 520 allows a user to create logs using a log template tool. The read/view permission 510 is a read permission that allows the user to view published versions of all logs. The create permission 512 is a write permission that allows the user to create a log using a log template builder. The update permission 514 is a write permission that allows a user to edit an existing log used in the system. The delete permission 516 allows a user to delete a log out of the system.

The closed daily log 522 allows a user to enter a reason why a daily log was not completed and mark the log as "closed." The only permission available is the delete permission 516, the selection of which allows the user to enter why the log was not completed.

The completed daily logs 524 relate to completed logs. The read/view permission 510 gives the user the ability to review completed logs. The create permission 512 give the user the ability to create and complete logs in the system. The update permission 514 allows a user to edit a completed log. The delete permission 516 allows a user to delete a log that has been marked as approved or completed.

The scheduled daily logs 526 relates to scheduling log items. The read/view permission 510 allows a user to view scheduled daily logs. The create permission 512 allows a user to schedule logs for a site, and the delete permission 516 allows a user to delete a log schedule.

The completed by daily logs 528 relates to who completed a log. The read/view 510 permission allows a user to specify which user completed a log, or change which user completed the log.

The selection of permissions is stored in the permissions and notifications data 140. Selecting the next button 530 transitions to the user interface 600 of FIG. 6, and selecting the back button 532 transitions to the user interface 400 of FIG. 4.

The user interface 500 of FIG. 5 can be used to give permissions for a user for all log items for a site or sites with which the user is associated. In other implementations, a user associated with a site can be association with only a proper subset of the logs for the site. For example, based on the second association 132 of the sites and the site users, the system 100 can determine, for each site user, each site with which the site user is associated. Then, for each site with which the site user is determined to be associated, the system 100 determines set of log requirements for the site. For example, assume a user is associated with the sites Farm A and Farm B. For each site, the log requirements for that site will be displayed according to the site with which they are associated.

The log requirements for each site may then be selected individually for the user, and the notifications for each log equipment so selected may then be set. This allows for a tailored list of log requirements for each site to be assigned to each user. For example, assume the sites Farm A and Farm B each have a dozen separate log requirements, and that a particular site user associated with both sites is only responsible for a pesticide log requirement for each site. The dozen log requirements for each site will be displayed, and only the pesticide log requirement will be selected for each site. Accordingly, the user will only have access to and permissions for the pesticide log item for each of site Farm A and Farm B.

Figure 6:
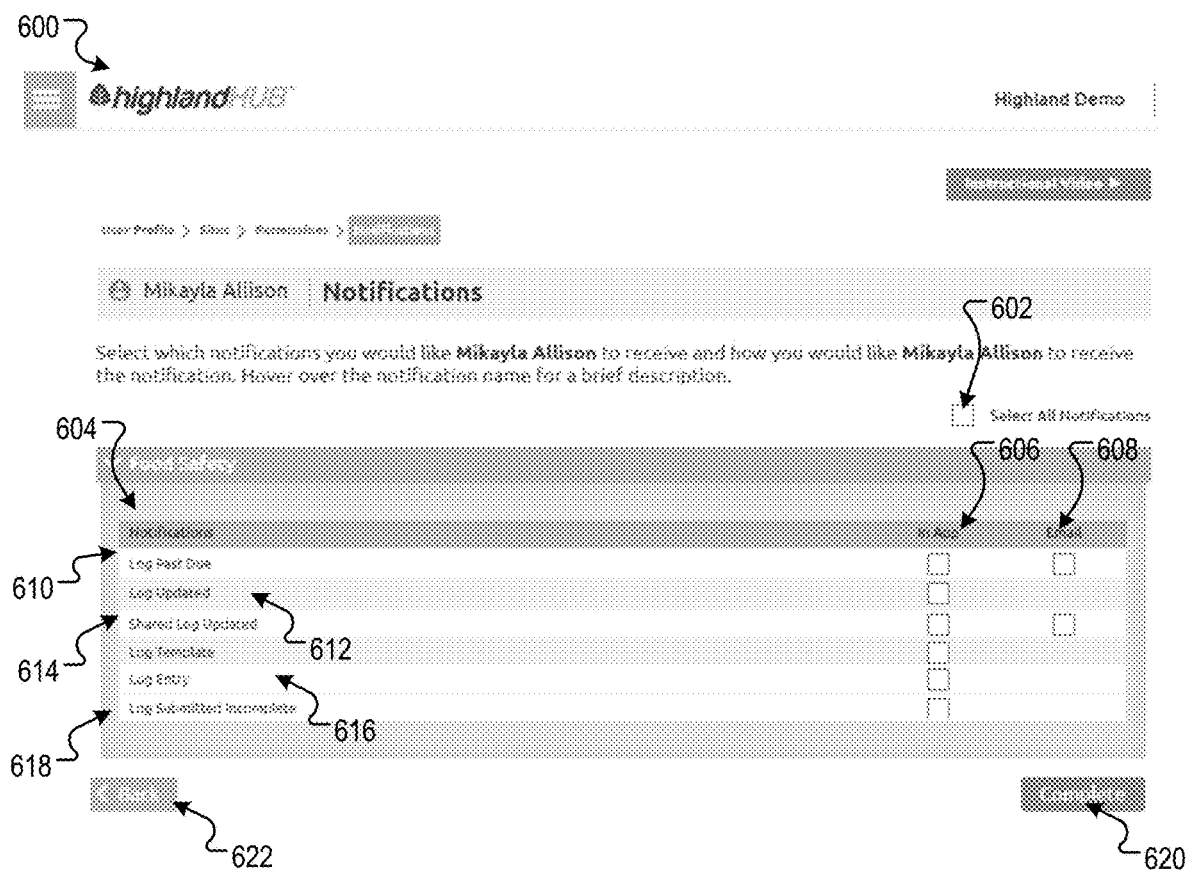
FIG. 6 is an illustration of a user interface for providing setting notifications for a notified user.

FIG. 6 is an illustration of a user interface 600 for providing setting notifications for a notified user. The user interface 600 includes a selection 602 that results in a selection of all listed notifications 604. Alternatively, notifications can be selected individually. Notifications can be delivered within an application by selecting In App selection 608, or by e-mail by selecting the Email selection 610.

Example notifications include log past due 610, log updated 612, shared log updated 614, log entry 616, and log submitted incomplete 618. The log past due 610 notification causes the system to generate a notification when a log item is not completed by a completion time. The log update 612 notification cause the system to generate a notification when a completed log item is updated. The shared log 614 notification is a notification that is generated when a log shared with the notified user is updated. The log entry 616 notification causes the system to generate a notification when a new log item is generated for the site with which the notified user is responsible. The log submitted incomplete 618 notification causes the system to generate a notification when a log is submitted but is incomplete.

The notifications listed in FIG. 6 are illustrative, and addition notification types can also be used. Selecting complete button 620 saves the data generated from use of the user interfaces of FIGS. 2-6, and selecting the back button 622 transitions to the user interface 500 of FIG. 5.

Figure 7:
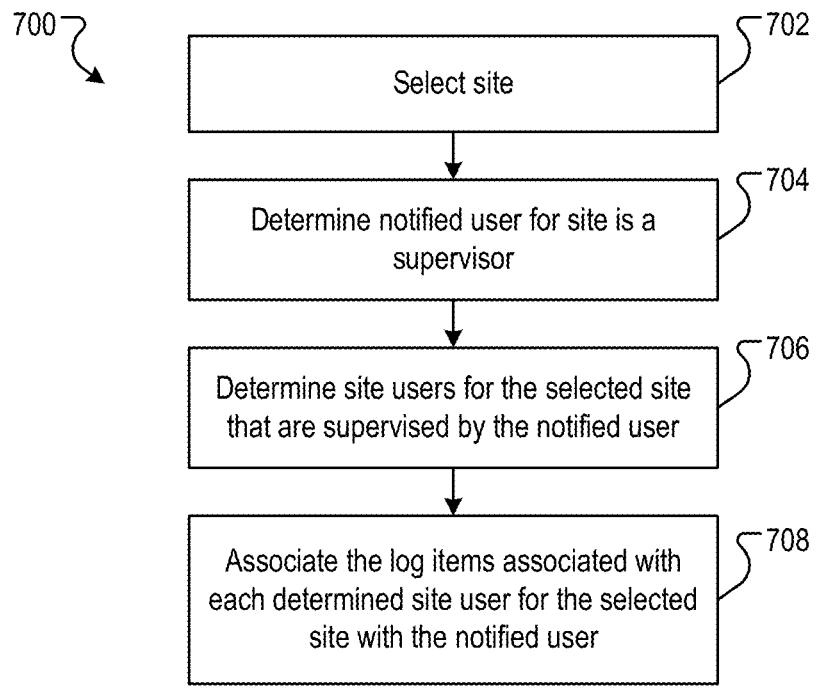
FIG. 7 is a flow diagram of an example process for associating notifications for a site with a notified user for the site.

FIG. 7 is a flow diagram of an example process 700 for associating notifications for a site with a notified user for the site. The process 700 is used when an administer wants a supervisor to receive notifications for log items associated with site users that are supervised by the notified user.

The process 700 receives a site selection (702). The site selection specifies a particular site.

The process 700 determines the notified user for the site is a supervisor (704). In response, the process 700 then determines site users for the selected site that are supervised by the notified user (706).

Then, for each site user associated with the site and supervised by the notified user, the process 700 associates the log items associated with each determined site user for the selected site with the notified user (708). The data structures that cause the notifications to be sent to the notified user are automatically generated based on the association. As a result, the notified user will receive notifications for all log items of site users supervised by the notified user. This process enables notified users to receive only notifies for log items associated with users they supervise.

In other implementations, an association to provide notifications for log requirements for a specific site are based on the notified user being responsible for the site. Thus, all notifications for the site will be provided to the notified user. This enables notifications to be provided to the notified user without requiring the direct reports to the notified user to be specified. In other words, the notifications are provided based on the notified user's site responsibility, and not based on a hierarchal employee/supervisor arrangement. This ensures that the notified user will be provided notifications despite employee attrition or employee changes, thus simplifying data management.

In still other implementations, an association to provide notifications for log requirements for a specific site are based on the notified user being responsible for the site, and based on the notified user being specifically associated with the specific log requirements. This enables notifications for a proper subset of log requirements for a site to be provided to the notified user without requiring the direct reports to the notified user to be specified. In other words, the notifications are provided based on the notified user's site responsibility and the proper subset of log requirements for which the notified user is responsible, and not based on a hierarchal employee/supervisor arrangement. Again, this ensures that the notified user will be provided notifications despite employee attrition or employee changes, thus simplifying data management. Moreover, the notified user is not provided with notification for which the notified user is not responsible.

Figure 8:
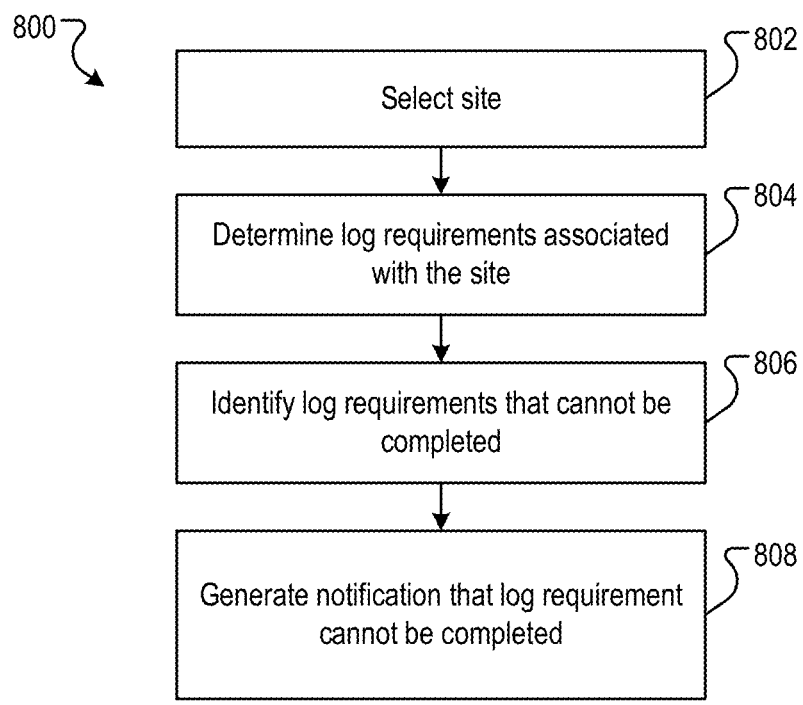
FIG. 8 is a flow diagram of an example process for identify log requirements that cannot be completed.

FIG. 8 is a flow diagram of an example process 800 for identify log requirements that cannot be completed. The process 800 is used to ensure that each log requirement has at least one site user associated with it.

The process 800 receives a site selection (802). Then, for the selected site, the process 800 determines, based on the first association, the log requirements associated with the site (804).

The process 800 then identifies log requirements that cannot be completed (806). For example, for each log requirement associated with the site, the process 800 determines whether at least one site user, based on the second association, is associated with the log requirement and a write user permission. For each log requirement associated with the site and determined to not be associated with at least one site user and a write user permission, the log requirement is determined to be unable to be completed.

The process 800 then generates a notification indicating the log requirement cannot be completed (808). For example, the notification may indicate the log requirement does not have an associated site user that can write the log item specified by the log requirement.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   storing, in a data store, a first association of a plurality of sites and a plurality of log requirements, wherein the first association associates, for each site, a set of log requirements for the site, wherein:
     each log requirement is a periodic log requirement that specifies a particular log item and a repeating period for the log item, and wherein for each repeating period, the particular log item is to be completed by a user by a completion time for the repeating period;
     each site specifies a particular physical location that is different from each other physical location for each other site, and each site is a specific site of an agricultural enterprise;
     wherein at least two or more log requirements specify respective repeating periods that are different from each other;
   storing, in the data store, a second association of the plurality of sites and a plurality of site users, wherein the second association associates, for each site, a set of users that are specified as being responsible for the site as site users for the site, wherein each site user is associated with at least one log requirement for the site;
   storing, in the data store, a third association of the plurality of sites and a plurality of notified users, wherein the third association associates, for each site, at least one notified user that receives notifications for particular log items associated with the site;
   for each repeating period of a log requirement, determining, by the data processing apparatus, whether the log requirement is completed by the completion time for the log requirement for that repeating period;
   for each log requirement determined not to be completed by the completion time for the log requirement for that repeating period:
     generating a first notification specifying the log requirement was not completed by the completion time;
     determining, based on the first association, the second association, and the third association, the notified user for the site for which the log requirement is associated; and
     sending, to the notified user, the first notification;
   for each log requirement determined to be completed by the completion time for the log requirement for that repeating period:
     generating a second notification specifying the log requirement was completed;
       determining, based on the first association, the second association, and the third association, the notified user for the site for which the log requirement is associated; and
       sending, to the notified user, the second notification.

2. The computer-implemented method of claim 1, further comprising:
   based on the second association of the plurality of sites and the plurality of site users:
     determining, for each site user, each site with which the site user is associated; and
     for each site with which the site user is determined to be associated:
       determining the set of log requirements for the site;
       providing, for display at a user device, a user interface that lists for each site with which the site user is associated, user permissions for the log requirements for the site, the user interface including a selection option for each user permission to select or deselect the user permission;

receiving, from the user device, data specifying selections of user permissions, each selection of a user permission specifying an association of the site user, the site, the log requirements for the site, and user permissions for the log requirements for the site; and storing, in the second association, the association of the site user, the site, the log requirements for the site and the user permissions for the log requirements for the site.

3. The computer-implemented method of claim 2, wherein the user permissions include:
a read permission that, when selected, enables a site user to read a log item of a log requirement with which the site user is associated; and
a write permission that, when selected, enables a site user to write a log item of a log requirement with which the site user is associated.

4. The computer-implemented method of claim 3, wherein storing, in the data store, a second association of the plurality of sites and a plurality of site users, wherein the second association associates, for each site, a set of users that are specified as being responsible for the site as site users for the site, wherein each site user is associated with at least one log requirement for the site comprises:
for each site:
determining, based on the first association, the log requirements associated with the site;
for each log requirement associated with the site, determining whether at least one site user, based on the second association, is associated with the log requirement and a write permission; and
for each log requirement associated with the site and determined to not be associated with at least one site user and a write permission, generating a notification indicating the log requirement does not have an associated site user that can write the log item specified by the log requirement.

5. The computer-implemented method of claim 1, wherein for at least one site, a site user associated with the site and a notified user associate with the site are a same user.

6. The computer-implemented method of claim 5, wherein storing, in the data store, a third association of the plurality of sites and a plurality of notified users, wherein the third association associates, for each site, at least one site user as a notified user that receives notifications for particular log items associated with the site comprises, for each site:
determining that the notified user associated with the site is a supervisor of one or more site users associated with the site;
for each site user associated with the site, determining the log items associated with the one or more site users for which the notified user is the supervisor; and
storing, in the third association, the determined log items associated with the one or more site users for which the notified user is the supervisor as the particular log items.

7. The computer-implemented method of claim 1, wherein for at least one site, a site user associated with the site and a notified user associate with the site are different users.

8. The computer-implemented method of claim 1, wherein storing, in the data store, a third association of the plurality of sites and a plurality of notified users, wherein the third association associates, for each site, at least one site user as a notified user that receives notifications for particular log items associated with the site comprises, for each site:
determining that the notified user associated with the site is a supervisor of one or more site users associated with the site;
for each site user associated with the site, determining the log items associated with the one or more site users for which the notified user is the supervisor; and
storing, in the third association, the determined log items associated with the one or more site users for which the notified user is the supervisor as the particular log items.

9. A system, comprising:
one or more computers in data communication with each other; and
a non-transitory computer readable medium storing instructions executable by the one or more computers and that upon such execution cause the one or more computers to perform operations comprising:
storing, in a data store, a first association of a plurality of sites and a plurality of log requirements, wherein the first association associates, for each site, a set of log requirements for the site, wherein:
each log requirement is a periodic log requirement that specifies a particular log item and a repeating period for the log item, and wherein for each repeating period, the particular log item is to be completed by a user by a completion time for the repeating period;
each site specifies a particular physical location that is different from each other physical location for each other site, and each site is a specific site of an agricultural enterprise; and
wherein at least two or more log requirements specify respective repeating periods that are different from each other;
storing, in the data store, a second association of the plurality of sites and a plurality of site users, wherein the second association associates, for each site, a set of users that are specified as being responsible for the site as site users for the site, wherein each site user is associated with at least one log requirement for the site;
storing, in the data store, a third association of the plurality of sites and a plurality of notified users, wherein the third association associates, for each site, at least one notified user that receives notifications for particular log items associated with the site;
for each repeating period of a log requirement, determining, by the data processing apparatus, whether the log requirement is completed by the completion time for the log requirement for that repeating period;
for each log requirement determined not to be completed by the completion time for the log requirement for that repeating period:
generating a first notification specifying the log requirement was not completed by the completion time;
determining, based on the first association, the second association, and the third association, the notified user for the site for which the log requirement is associated; and
sending, to the notified user, the first notification;
for each log requirement determined to be completed by the completion time for the log requirement for that repeating period:
generating a second notification specifying the log requirement was completed;

determining, based on the first association, the second association, and the third association, the notified user for the site for which the log requirement is associated; and sending, to the notified user, the second notification.

10. The system of claim 9, the operations further comprising:

based on the second association of the plurality of sites and the plurality of site users:

determining, for each site user, each site with which the site user is associated; and for each site with which the site user is determined to be associated:

determining the set of log requirements for the site;

providing, for display at a user device, a user interface that lists for each site with which the site user is associated, user permissions for the log requirements for the site, the user interface including a selection option for each user permission to select or deselect the user permission;

receiving, from the user device, data specifying selections of user permissions, each selection of a user permission specifying an association of the site user, the site, the log requirements for the site, and user permissions for the log requirements for the site; and storing, in the second association, the association of the site user, the site, the log requirements for the site and the user permissions for the log requirements for the site.

11. The system of claim 10, wherein the user permissions include:

a read permission that, when selected, enables a site user to read a log item of a log requirement with which the site user is associated; and a write permission that, when selected, enables a site user to write a log item of a log requirement with which the site user is associated.

12. The system of claim 11, wherein storing, in the data store, a second association of the plurality of sites and a plurality of site users, wherein the second association associates, for each site, a set of users that are specified as being responsible for the site as site users for the site, wherein each site user is associated with at least one log requirement for the site comprises:

for each site:

determining, based on the first association, the log requirements associated with the site;

for each log requirement associated with the site, determining whether at least one site user, based on the second association, is associated with the log requirement and a write permission; and for each log requirement associated with the site and determined to not be associated with at least one site user and a write permission, generating a notification indicating the log requirement does not have an associated site user that can write the log item specified by the log requirement.

13. The system of claim 9, wherein for at least one site, a site user associated with the site and a notified user associate with the site are a same user.

14. The system of claim 9, wherein for at least one site, a site user associated with the site and a notified user associate with the site are different users.

15. The system of claim 14, wherein storing, in the data store, a third association of the plurality of sites and a plurality of notified users, wherein the third association associates, for each site, at least one site user as a notified user that receives notifications for particular log items associated with the site comprises, for each site:

determining that the notified user associated with the site is a supervisor of one or more site users associated with the site;

for each site user associated with the site, determining the log items associated with the one or more site users for which the notified user is the supervisor; and storing, in the third association, the determined log items associated with the one or more site users for which the notified user is the supervisor as the particular log items.

16. The system of claim 9, wherein storing, in the data store, a third association of the plurality of sites and a plurality of notified users, wherein the third association associates, for each site, at least one site user as a notified user that receives notifications for particular log items associated with the site comprises, for each site:

determining that the notified user associated with the site is a supervisor of one or more site users associated with the site;

for each site user associated with the site, determining the log items associated with the one or more site users for which the notified user is the supervisor; and storing, in the third association, the determined log items associated with the one or more site users for which the notified user is the supervisor as the particular log items.

17. A non-transitory computer readable medium storing instructions executable by one or more computers and that upon such execution cause the one or more computers to perform operations comprising:

storing, in a data store, a first association of a plurality of sites and a plurality of log requirements, wherein the first association associates, for each site, a set of log requirements for the site, wherein:

each log requirement is a periodic log requirement that specifies a particular log item and a repeating period for the log item, and wherein for each repeating period, the particular log item is to be completed by a user by a completion time for the repeating period;

each site specifies a particular physical location that is different from each other physical location for each other site, and each site is a specific site of an agricultural enterprise; and wherein at least two or more log requirements specify respective repeating periods that are different from each other;

storing, in the data store, a second association of the plurality of sites and a plurality of site users, wherein the second association associates, for each site, a set of users that are specified as being responsible for the site as site users for the site, wherein each site user is associated with at least one log requirement for the site;

storing, in the data store, a third association of the plurality of sites and a plurality of notified users, wherein the third association associates, for each site, at least one notified user that receives notifications for particular log items associated with the site;

for each repeating period of a log requirement, determining, by the data processing apparatus, whether the log requirement is completed by the completion time for the log requirement for that repeating period;

for each log requirement determined not to be completed by the completion time for the log requirement for that repeating period:

generating a first notification specifying the log requirement was not completed by the completion time;
determining, based on the first association, the second association, and the third association, the notified user for the site for which the log requirement is associated; and
sending, to the notified user, the first notification;
for each log requirement determined to be completed by the completion time for the log requirement for that repeating period:
generating a second notification specifying the log requirement was completed;
determining, based on the first association, the second association, and the third association, the notified user for the site for which the log requirement is associated; and
sending, to the notified user, the second notification.

\* \* \* \* \*